United States Patent [19]

Diener et al.

[11] Patent Number: 4,640,124

[45] Date of Patent: Feb. 3, 1987

[54] TECNOSCOPES

[75] Inventors: Jörg Diener, Oberderdingen; Ehrenfried Bitrolf, Knittlinger-Kleinvillars, both of Fed. Rep. of Germany

[73] Assignee: Richard Wolf GmbH, Fed. Rep. of Germany

[21] Appl. No.: 697,623

[22] Filed: Feb. 4, 1985

[30] Foreign Application Priority Data

Feb. 16, 1984 [DE] Fed. Rep. of Germany ....... 3405541

[51] Int. Cl.⁴ ............................................. G02B 23/26
[52] U.S. Cl. ....................................... 73/116; 356/241; 350/96.26
[58] Field of Search ................. 73/119 A, 119 R, 116, 73/117.3, 432 G, 432 B, 432 R; 356/43, 241; 350/96.26, 506, 573

[56] References Cited

U.S. PATENT DOCUMENTS

| | | | |
|---|---|---|---|
| 3,610,231 | 10/1971 | Takahashi | 350/96.26 |
| 3,690,775 | 9/1972 | Cousins | 356/241 |
| 3,724,922 | 4/1973 | Jones | 356/241 |
| 3,778,170 | 12/1973 | Howell et al. | 356/241 |
| 3,855,897 | 12/1974 | Takahashi et al. | 350/96.26 |
| 4,273,111 | 6/1981 | Tsukaya | 356/241 |
| 4,530,568 | 7/1985 | Haduch et al. | 350/96.26 |

*Primary Examiner*—Stewart J. Levy
*Assistant Examiner*—Robert R. Raevis
*Attorney, Agent, or Firm*—Hill, Van Santen, Steadman & Simpson

[57] ABSTRACT

A technoscope for internal inspection of plant such as special aircraft power units equipped with non-circular, preferably cornered (e.g. square) wall ports comprises a rigid first metal guide shaft of non-circular cross-section insertible into one of the wall ports and having a lateral distal outlet guide, and a guiding element which passes through said first guide shaft and has a flexible distal portion, an intermediate portion whose cross-section matches that of the first guide shaft and a proximal control system for controlled deflection of said flexible distal end. The guiding element is used to guide a flexible endoscope shaft to the desired site within the plant to be inspected.

8 Claims, 6 Drawing Figures

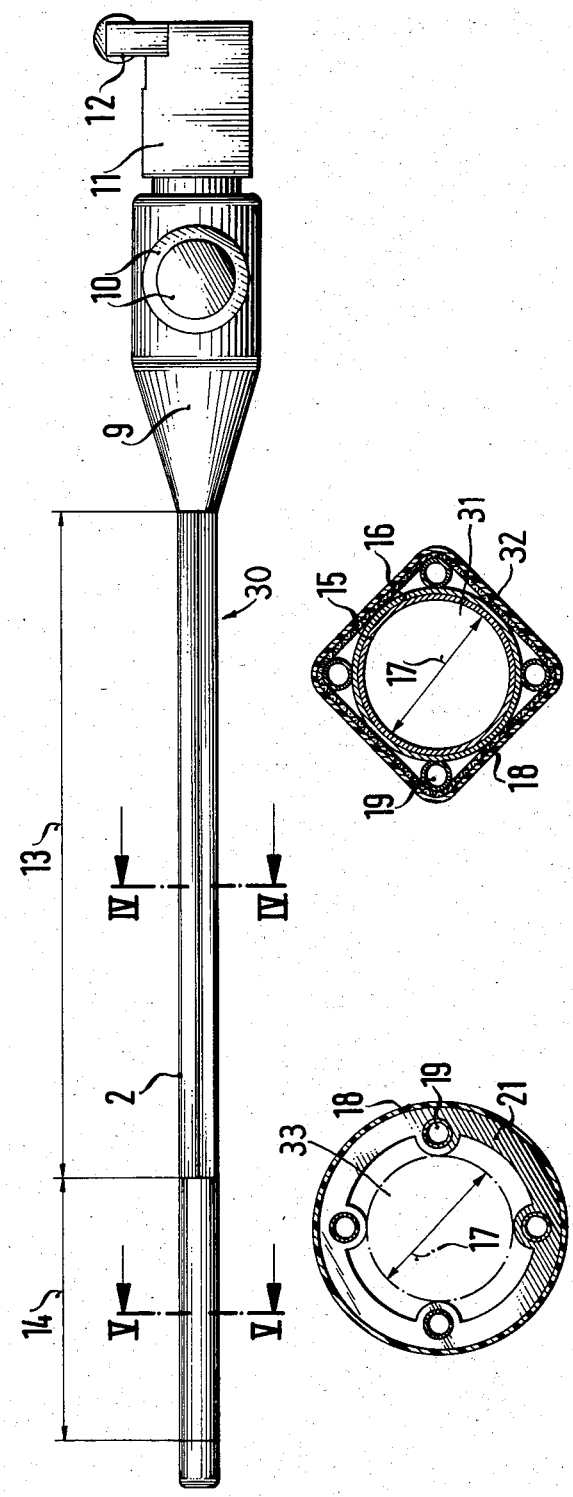

TECNOSCOPES

FIELD OF THE INVENTION

The invention relates to a technoscope, in particular for inspection of aircraft power plants which have casing walls equipped with closable non-circular (typically square) ports for traversal by the technoscope.

DESCRIPTION OF THE PRIOR ART

It is known that cavities in machinery and the like may be inspected by means of rigid or flexible endoscopes. Steerable flexible endoscopes have advantages in this connection but are excluded for inspection of aircraft power plant of special construction since they fail to meet the special requirements for this purpose, namely that they should be of great mechanical strength and also flexible and able to follow abrupt changes in direction, whilst at the same time having a particular degree of rigidity so that they may bridge greater distances up to the point of inspection without significant deflection, and be inserted in existing openings of particular geometrical shape and size.

SUMMARY OF THE INVENTION

It is an object of the invention to construct a technoscope in such a manner that it fulfills all the aforesaid requirements.

In resolution of this problem, the technoscope in accordance with the invention comprises a first rigid metal guiding shaft of non-circular cross-section, which is insertible into the wall ports and equipped with a distal lateral outlet and guiding system, and a comparatively flexible guiding element deflectible by proximal control action and having a cross-section complementary to the guiding shaft and an axial passageway through which may be passed a highly flexible conventional endoscope.

The basis adopted thus consists of a known flexible endoscope which is however combined with two guiding systems. The first system includes a rigid guiding shaft which is passed through frequently or usually very sharp-edged wall openings of the power plant and thereby prevents damage to the flexible endoscope, and then a second system includes a guiding element which may be passed through the rigid guiding shaft and receives the flexible endoscope. The guiding element has a comparatively low degree of flexibility along its greater portion and may be steered optionally at its distal extremity by manipulation, so that it is possible to bridge greater distances and to offer up a distal lens of an endoscope received in the guiding element to the parts to be inspected.

In this connection, it is advantageous to construct the steerable guiding element so that the flexible guiding element comprises a proximal longitudinal portion having a comparatively low degree of flexibility and preferably comprising two coils of metal strip wound in opposed directions and in close mutual contact. A steerable distal longitudinal portion comprising known segments pivotable with respect to each other is joined to the proximal longitudinal portion.

In this way, it is possible to bridge greater distances by means of the proximal longitudinal portion of relatively low flexibility and optional and even abrupt deflections may be obtained for the flexible endoscope which extends through the guiding element.

The invention is described in the following with reference to the drawings in which an example of embodiment is illustrated diagrammatically.

BRIEF DESCRIPTION OF THE DRAWINGS

FIG. 1 shows a side view with a distal portion broken away of a guiding shaft insertible in a casing wall perforation of a power plant, FIG. 2 shows a plan view of the guiding shaft according to FIG. 1, FIG. 3 shows a side view of a guiding element for a flexible endoscope, which may be passed through the guiding shaft of FIG. 1, FIGS. 4 and 5 show cross-sections along the lines IV—IV and V—V of FIG. 3.

DETAILED DESCRIPTION OF THE PREFERRED EMBODIMENT

Figure 6:
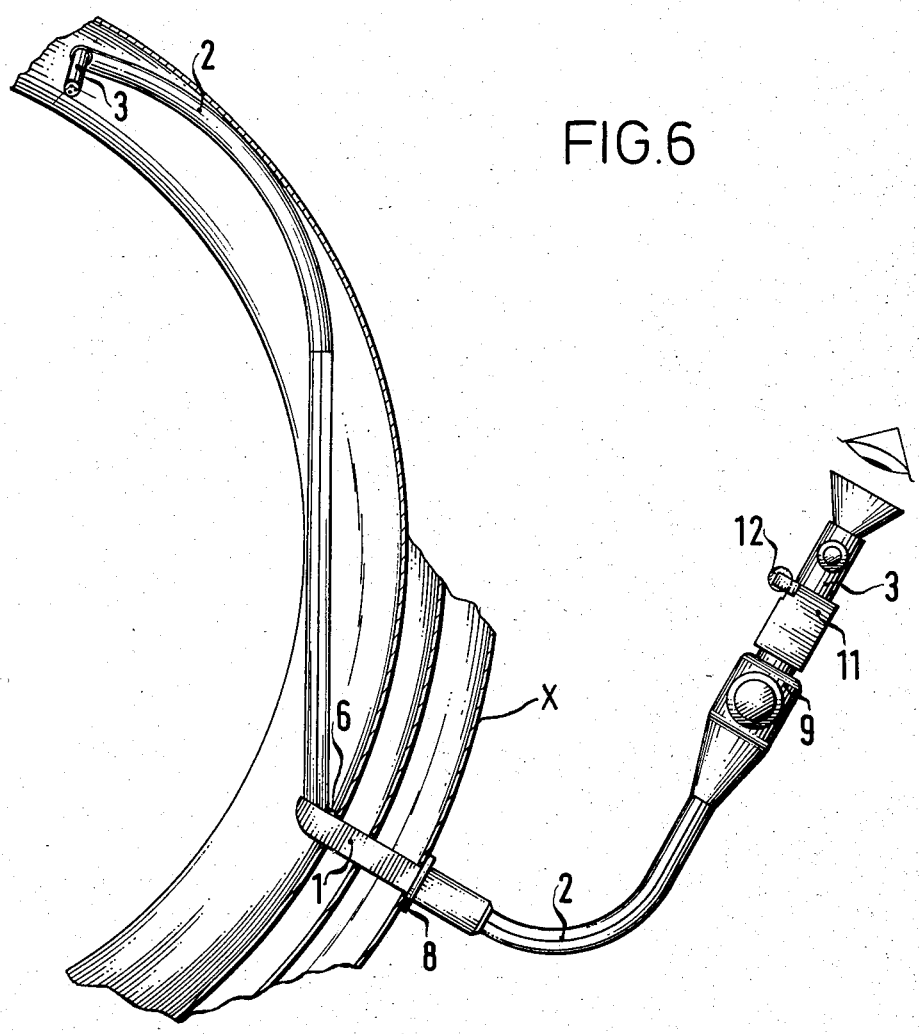
FIG. 6 shows a a cross-sectional view with portions in elevation of the technoscope of the present invention inserted in a combustion chamber of a power plant.

The technoscope shown in the drawings comprises three parts which are to be combined with each other, namely a short guiding shaft 1 (FIGS. 1 and 6), a guiding element 30 (FIGS. 3, 4, 5 and 6) extending through the guiding shaft 1, and a flexible endoscope 3 of a known type whereof the proximal and distal parts are visible in FIG. 6.

The guiding shaft 1 (FIGS. 1 and 2) is a rigid metal shaft of non-circular, preferably cornered cross-section (in this case square) which at the distal extremity is equipped with a lateral opening 4 whereof the wall section opposite to the opening 4 forms an arcuate terminal guiding surface 5 of the shaft 1. The proximal extremity of the opening is delimited by a projection 6 of an elastic wall tongue or strip 7. At its proximal side, the projection 6 forms an angle with the axis of the shaft 1. By grasping a proximal extremity or handle 1a of the guiding shaft 1, it may be inserted into an advantageously closable perforation of a rectangular or square configuration in the wall of a power plant casing X. The projection 6 of the strip 7 initially will be deflected inwards and finally springs back elastically outwards after the shaft 1 has been fully inserted through the wall perforation. The projection 6 prevents the shaft 1 from dropping out of the wall perforation accidentally. As soon as the projection 6 engages behind the inner combustion chamber wall, a flange 8 bears externally against an outer surface of the casing wall X of the power plant. The shaft 1 may be pulled out of the wall perforation by means of the handle 1a.

The guiding element 30 is passed through the rigid inserted guiding shaft 1. This element comprises a proximal control casing 9 having steering handles 10 and a mount 11 comprising clamping means 12 for engaging a flexible endoscope 3 of known type (FIG. 6).

The control casing 9 is joined by a shaft 2 having a longer longitudinal portion 13 and a shorter distal longitudinal portion 14. The longitudinal portion 13 has a lower degree of flexibility than known flexible endoscopes and is produced from two metal coils 15 and 16 wound contradirectionally and lying one over the other to produce an axial passageway 31 (FIG. 4); and having a slightly larger diameter 17 than that of the endoscope 3 which is to be passed through the passageway 31. The coils 15 and 16 are enclosed by wire netting 18 as well as by a shrunk-on tube 32, and control wires within guiding sleeve 19 extends between the netting 18 and the outer coil 16 so that the proximal longitudinal portion 13 of the guiding element assumes an essentially square cross-section.

The distal longitudinal portion 14 of the guiding element 30 has a continuation 33 of the axial passageway 31 with an internal diameter corresponds to the diameter 17 of the longitudinal portion 13, which continuation 33 is formed by flexible interconnected segments 21 which are axially pivotable with respect to each other, as is known in endoscope technology, and—in this case—the guiding sleeves 19 are situated on the inner side of the segments without reducing the diameter 17.

After the rigid guiding shaft 1 has been inserted into a selected power plant port and has been secured in a stable position by engagement of the projection 6 behind the inner combustion chamber wall, the flexible guiding element 30 and the flexible endoscope already pushed into the same may conjointly be inserted into the combustion space of the power unit through the rigid guiding shaft 1. Since the distal extremities of the flexible endoscope and of the flexible guiding element 30 lie at the same level upon insertion into the combustion space, it is already possible to check on the direction of displacement through the flexible endoscope upon reaching the combustion space, and to make a selection of points for closer visual inspection. By means of the control of the guiding of the distal longitudinal; and portion 14 of the shaft 2, it is possible to steer the flexible endoscope in any optional direction, and the same may have its objective lens extremity emerging out of the distal extremity of the shaft 2 guided onwards in the direction towards a selected point within the power unit. Thus and a thorough visual inspection may be performed by distal-side steering of the flexible endoscope. Thanks to the guiding of the distal longitudinal portion 13 of the shaft 2 of the guiding element 30, the flexible endoscope used for inspection may also be led over greater areas within the combustion chamber of the power unit, without substantial directional deflections.

What is claimed is:

1. A technoscope for internal inspection of power plants and the like by insertion through a wall port thereof, said technoscope comprising:
    a rigid first guide shaft of non-circular cross-section for insertion in said wall port, said shaft having a distal end equipped with a lateral outlet adjacent the distal end;
    a flexible second guiding element being pass through said first guide shaft with a sliding fit and extend out of said lateral outlet, said second guiding element having a deflectable distal end portion, a proximal end portion with a control system for controlling deflection of said distal end portion and an axial intermediate portion whose cross-section is complementary with the internal cross-section of the first guide shaft, said second guiding element having an axial passageway extending therethrough; and
    a separate flexible endoscope being slideable received in said axial passageway with a distal end of the flexible endoscope extending pass said distal end of the second guiding element.

2. A technoscope according to claim 1, wherein the distal end portion and intermediate portion have different flexibilities with the intermediate portion having a lesser degree of flexibility than the distal end portion, said distal end portion having a circular cross-section and being unrestrictedly deflectable by control wires extending from the control system through the intermediate portion externally of the axial passageway and into the distal end portion.

3. A technoscope according to claim 2, wherein said intermediate portion has two concentric coils which are wound in opposed directions and in close contact with each other to form the axial passageway, said control wires being in passages circumferentially spaced on an outer surface of the outermost coil of the two coils.

4. A technoscope according to claim 3, wherein said distal end portion is formed by pivotally connected members having passages for the control wires aligned with the passages of the intermediate portion.

5. A technoscope as claimed in claim 1, wherein said control system of the guiding element includes a mount at the proximal end of the second guiding element and means for releasably securing the flexible endoscope inserted into the second guiding element.

6. A technoscope comprising:
    a flexible endoscope;
    a rigid hollow guide shaft of non-circular cross-section having at its distal end a lateral outlet opening and an axial end surface curving towards said outlet opening, a radially extending stop flange positioned at a proximal end of said guide shaft, a resilient tongue integral with a wall of said shaft and extending in the distal direction of the shaft with its distal end defining a proximal edge of said outlet opening, an outwardly extending projection on the distal end of said tongue; and
    a guiding element adapted to pass through said guide shaft and to project out of said lateral outlet opening, said element having an axial passageway therethrough for receiving the flexible endoscope, said element comprising a proximal end, a flexible distal portion of a circular cross-section, an intermediate portion having a non-circular cross-section matching an internal cross-section of said guide shaft and a lower degree of flexibility than that of said distal portion and a control system at the proximal end to cause controlled deflection of said distal end portion by means of control wires running from said control system to said distal end portion through guiding sleeves enclosed between an inner and outer wall of said intermediate portion and spaced circumferentially around said inner wall.

7. A technoscope for internal inspection of power plants and the like by insertion through a wall port thereof, said technoscaope comprising:
    a flexible endoscope;
    a rigid first guide shaft of non-circular cross-section for insertion in said wall port, said shaft having a distal end equipped with a lateral outlet, said first guide shaft having its distal end closed off by a guiding surface arranged opposite to said lateral outlet and raising towards its distal extremity of the lateral outlet and the proximal extremity of the lateral outlet terminating with an obtuse projection extending at an angle with the axis of the shaft as a resiliently pivotable tongue of the shaft wall; and
    a flexible second guiding element adapted to pass through said first guide shaft with a sliding fit and extend out of said lateral outlet, said second guiding element having a deflectable distal end portion, a proximal end portion with a control system for controlling deflection of said distal end portion and an axially intermediate portion whose cross-section is complementary with the internal cross-section of the first guide shaft, said second guiding element having an axial passageway extending therethrough for receiving the flexible endoscope.

8. A technoscope as claimed in claim 7, wherein said first guide shaft has a radially extending stop to bear against an outer surface of a power plant jacket of the plant being inspected, said obtuse projection being axially spaced from said stop for engagement behind an inner combustion chamber wall.

* * * * *